(12) United States Patent
Amezaga et al.

(10) Patent No.: US 10,366,507 B2
(45) Date of Patent: Jul. 30, 2019

(54) OPTICAL IMAGING AND ASSESSMENT SYSTEM FOR TONG CASSETTE POSITIONING DEVICE

(71) Applicant: Weatherford Technology Holdings, LLC, Houston, TX (US)

(72) Inventors: Federico Amezaga, Cypress, TX (US); Christina Karin Hebebrand, Hannover (DE); Frank Wern, Hannover (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 15/681,141

(22) Filed: Aug. 18, 2017

(65) Prior Publication Data

US 2019/0057516 A1 Feb. 21, 2019

(51) Int. Cl.
*G06T 7/00* (2017.01)
*E21B 19/16* (2006.01)
*E21B 41/00* (2006.01)
*G06T 7/73* (2017.01)

(52) U.S. Cl.
CPC .............. *G06T 7/74* (2017.01); *E21B 19/161* (2013.01); *E21B 41/00* (2013.01); *G06T 7/001* (2013.01); *G06T 2207/10028* (2013.01); *G06T 2207/10048* (2013.01); *G06T 2207/30164* (2013.01)

(58) Field of Classification Search
None
See application file for complete search history.

(56) References Cited

U.S. PATENT DOCUMENTS

| | | |
|---|---|---|
| 6,318,214 B1 | 11/2001 | Buck |
| 7,001,065 B2 | 2/2006 | Dishaw et al. |
| 7,178,612 B2 | 2/2007 | Belik |
| 7,841,415 B2 | 11/2010 | Winter |
| 7,878,254 B2 | 2/2011 | Abdollahi et al. |
| 7,958,787 B2 | 6/2011 | Hunter |
| 9,068,406 B2 | 6/2015 | Clasen et al. |
| 2003/0205112 A1* | 11/2003 | Hawkins, III ........ E21B 19/163 81/57.34 |
| 2004/0223533 A1* | 11/2004 | Dishaw ................ E21B 19/165 374/4 |
| 2008/0282847 A1* | 11/2008 | Halse .................... E21B 19/165 81/57.15 |
| 2009/0065189 A1* | 3/2009 | Hobgood .............. E21B 19/165 166/77.51 |
| 2009/0159294 A1 | 6/2009 | Abdollahi et al. |

(Continued)

FOREIGN PATENT DOCUMENTS

WO WO 2016184667 A1 * 11/2016 ........... E21B 19/165

*Primary Examiner* — Vu Le
*Assistant Examiner* — Tracy Mangialaschi
(74) *Attorney, Agent, or Firm* — Patterson + Sheridan, LLP

(57) ABSTRACT

A method and apparatus for optical imaging and assessment of tong cassette positioning devices, including identifying a focus area on a tong cassette; optically imaging the focus area with an optical imaging device on a positioning device; and analyzing information from the optical imaging to determine an assessment of the focus area. A system includes: a tong cassette having a focus area; a positioning device having an optical imaging device to image the focus area; and an analyzing device functionally connected to the optical imaging device to receive information therefrom.

22 Claims, 11 Drawing Sheets

(56) References Cited

U.S. PATENT DOCUMENTS

| | | | |
|---|---|---|---|
| 2013/0271576 A1* | 10/2013 | Ellis | G06F 17/5009 |
| | | | 348/46 |
| 2014/0233804 A1 | 8/2014 | Gustavsson et al. | |
| 2015/0101826 A1* | 4/2015 | Gupta | E21B 19/164 |
| | | | 166/377 |
| 2015/0240582 A1* | 8/2015 | Bansal | E21B 34/14 |
| | | | 175/57 |

* cited by examiner

OPTICAL IMAGING AND ASSESSMENT SYSTEM FOR TONG CASSETTE POSITIONING DEVICE

BACKGROUND OF THE INVENTION

Embodiments of the present invention generally relate to optical imaging and assessment of tong cassette positioning devices for oil and gas rig equipment.

In an oil and gas rig environment, multiple operations may be performed simultaneously or in a fast sequence, wherein multiple parameters may need to be checked and/or validated in a short period of time. Sometimes gathering data about the parameters may require using multiple different sensors. For example, two different sensors and pressure switches may be used to identify functions or tool status such as tong doors (open/close) and back-up doors (open/close). When multiple different sensors are used to operate a tool (e.g., a casing tong, a tubing tong, an iron roughneck, a riser tong, etc.), there is an increased probability of malfunction of any of the sensors leading to malfunction of the tool. The costs associated with acquisition, maintenance, and/or troubleshooting of these sensors may also be problematic in conjunction with the downtime caused to the customer.

Sometimes gathering data about the parameters may expose rig personnel to hazardous areas. During operations such as rig-up or rig-down of equipment, rig personnel may be exposed to safety risks. However, such operations may be necessary to completely remove or install equipment on the rig. These operations are commonly time consuming and risky to rig personnel. For example, for tong cassette rig-up, the tong cassette may be brought to the rig floor using a rig crane. If the tong cassette is inside a tray, it may be lifted out of the tray and manually installed on the positioning device using a tugger line. Rig personnel may then align the tong cassette. Once the tong cassette is hanging from the positioning device, locking pins are placed and power lines are connected for tong cassette operation. The tugger line may be disconnected from tool, and the empty tray may be removed from the rig floor. The reverse process may be required to rig-down the tong cassette from the positioning device. These processes involve considerable intervention of rig personnel performing many different operations or steps requiring high level of attention and expertise.

During drilling and casing running operations, make-up and/or break-out pipe connections may be required. This may be accomplished by using an iron roughneck or tong with a back-up that is positioned in the well center by a positioning device. The same positioning device is commonly used for drilling and running casing—only the tool installed in the positioning device is interchanged depending on the operation to be performed. Changing operations may require removing the tong cassette installed in the positioning device, and installing the new tong cassette to run the subsequent operation. This activity is time consuming and can introduce safety hazards to rig personnel. Usually, to rig-down the tong cassette, a hoisting line may be connected, and locking pins may be manually removed from the positioning device. The tong cassette may be manually placed on a tray and removed from the rig floor. The reverse operation is performed to install a new tong cassette in the positioning device. Due to the size and the weight of the tong and wellbore tools, the tong on a positioning device may swing or tilt during tool transfer or tool operation. Once the new tong cassette is installed in the positioning device, certain parameters may be manually input in the torque monitoring system to specify the type of tong cassette installed, load cell range, type of turns counter, handle length, pipe size, thread type, pipe grade, optimum torque, shoulder torque, etc. Manually inputting a large number of parameters risks human errors that can cause a set of data to be invalid, and thereby risk malfunction or operation failure.

Also, it is common to visually inspect the tool before it is placed in operation. Visual checks including size of jaws installed on tong and back-up is often carried by an operator. The jaw size installed may be matched to the pipe size to be made-up or broken-out. Cross checks may be run between the operator visual check for jaw size and the pipe size selected in the torque monitoring system. It may be required to check the actual pipe size as well so all parameters may be matched before performing the job. Accuracy of gathering and communicating the information may be subject to human error, and recording of firsthand information is not available for further review.

Once all the tool parameters have been introduced in the system, the tong cassette is ready for operation.

It would be beneficial to accurately gather, communicate, and record information for real-time operations and for review over time.

SUMMARY OF THE INVENTION

Embodiments of the present invention generally relate to optical imaging and assessment of tong cassette positioning devices for oil and gas rig equipment.

In an embodiment, a method includes: identifying a focus area on a tong cassette; optically imaging the focus area with an optical imaging device on a positioning device; and analyzing information from the optical imaging to determine an assessment of the focus area.

In an embodiment, a system includes: a tong cassette having a focus area; a positioning device having an optical imaging device configured to image the focus area; and an analyzing device functionally connected to the optical imaging device to be able to receive information therefrom.

In an embodiment, an optical imaging and assessment system—for use with a positioning device and a tong cassette—includes: an optical imaging devices located on the positioning device; a focus area on the tong cassette, wherein the optical imaging device is positioned to be able to capture an optical image of the focus area; and a local controller located on the positioning device and functionally connected to the optical imaging device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A illustrates equipment, including a positioning device and a tong cassette, of the exemplary optical imaging and assessment system. FIG. 4B illustrates an optical imaging device located on a positioning device. FIG. 4C illustrates another optical imaging device located on another positioning device. FIG. 4D illustrates a tong cassette. FIG. 4E illustrates an interaction between the positioning device and the tong cassette. FIG. 4F illustrates another interaction between the positioning device and the tong cassette. FIG. 4G illustrates another interaction between the positioning device and the tong cassette.

DETAILED DESCRIPTION

Figure 1:
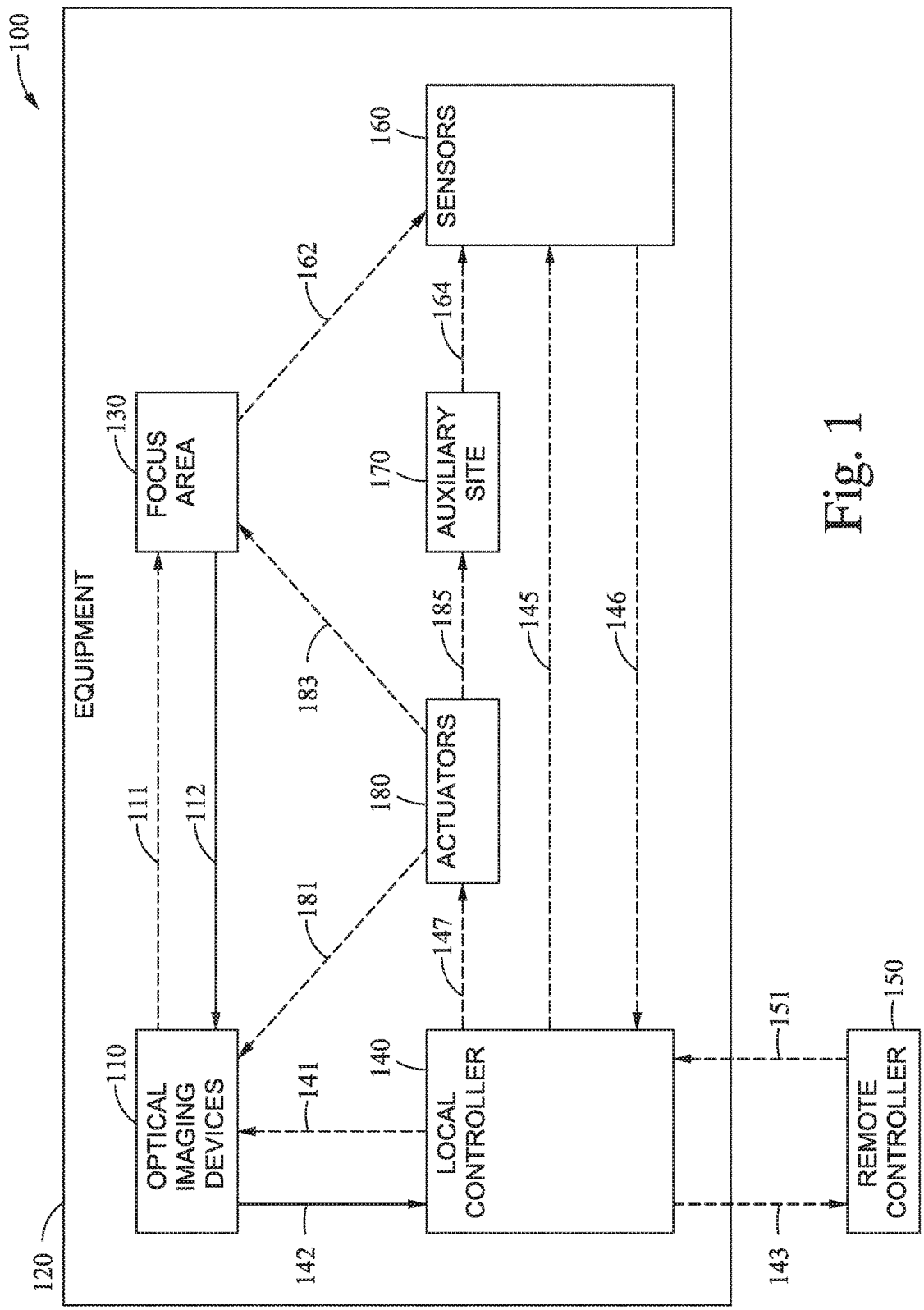
FIG. 1 illustrates an exemplary optical imaging and assessment system.

An optical imaging and assessment system (e.g., one or more cameras; one or more controllers) may be installed on rig equipment (e.g., positioning device, tong cassette, and/or tong cassette tray) to analyze and/or assess different focus areas in/on/near the rig floor. The system may be beneficial for a variety of different purposes.

The optical imaging and assessment system may be beneficial for automatic tong cassette connection and disconnection. In order to reduce rig personnel exposure and reduce rig-up and rig-down times, an optical imaging and assessment system can be installed on the positioning device to automate this process. Once a tong cassette has been placed on the rig floor, the optical imaging and assessment system installed on the empty positioning device may locate the tong cassette, identify the distance to the tong cassette, and/or identify the type of tong cassette. The information read by the optical imaging and assessment system may be sent to a control system to complete the tong cassette parameters (e.g., load cell range, type of turns counter, and handle length). The optical imaging and assessment system in conjunction, including a computer program for image processing and/or a programmable logic controller ("PLC"), may send commands to accomplish the connection of the positioning device with the tong cassette.

The optical imaging and assessment system may provide quicker, more reliable, and safer alternatives for gathering information about rig equipment than is currently available. In some embodiments, the optical imaging and assessment system may gather information from multiple locations simultaneously or close in time. Currently, the various information inputs may be spaced around the rig, making simultaneous or close in time assessment impractical or impossible. In some embodiments, a single camera with a wide field of view may be capable of gathering information from multiple locations simultaneously. It should be appreciated that some information inputs, sensors, or information locations may be at inconvenient or hazardous places. Replacement of manual information gathering with the optical imaging and assessment system may improve the risk profile of the overall operation. Additionally, information gathered by the optical imaging and assessment system may be objectively measured and logged for future review. This may improve reliability of the system, and provide opportunities for iterative adaptation as related operations are compared and contrasted.

The optical imaging and assessment system may be beneficial for tong cassette status and verification of parameters. In order to reduce the quantity of sensors installed on the tong cassette, an optical imaging and assessment system may be installed on the tong cassette. The optical imaging and assessment system may provide information such as: tong doors (open/close), backup doors (open/close), rotor location (angle), rotations per minute (rotor and pipe rotation), clamping system status (open/set), make/break switch and/or actuator position, stab-in process (detect upper edge of box and lower edge of pin/thread length or any other mark on the pipe to measure make-up loss), and/or stabbing guide (open/close).

The optical imaging and assessment system installed on the tong cassette may be beneficially used to identify certain objectives on the rig floor such as: tool joint height on well center, pipe size (cross check with data in torque monitoring system and jaw size installed on tong and backup), jaw size installed on tong and backup (cross check with data in torque monitoring system and pipe size in well center), pipe position in regards to tong (in case pipe is slightly misaligned with respect to well center), and/or safety zone surveillance (stops operation when an object enters specified danger zone).

The optical imaging and assessment system installed may be beneficially used to reduce of number of sensors, and, at the same time, add extra functionality for safety checks, validation of data, automatic input of tool parameters, and/or automatic connection/disconnection of tong cassette. Two sets of optical imaging and assessment systems may be installed on the positioning device and on the tong cassette. The overall benefits may include a reduction in rig-up/down time for tong cassette installation in positioning device increasing operational efficiency, reduction of rig personnel exposure to hazardous areas, addition of safety checks to reduce human errors during input of parameters, and/or reduction of number of sensors to be installed on the tong.

Methods of using the optical imaging and assessment system may reduce rig personnel exposure, reduce rig-up/down times, and/or reduce the human error during parameter input process for tong cassette information. For example, before the actual job begins, the optical imaging and assessment system may check the tong cassette to make sure there are no unexpected problems or issues with the equipment. The size of jaws installed on tong and back-up may be assessed. The jaw size installed may be correlated with the size of the pipe to be made-up or broken-out. Cross checking between the optical imaging check for jaw size and the pipe size selected in the torque monitoring system may be automated and/or logged. The actual pipe size may also be correlated so all three parameters are a match before performing the job. In some embodiments, the optical imaging and assessment system may assist with pipe handling. For example, automation of the pipe handling equipment may benefit from automation of the tong positioning and operation. The pipe handing equipment may be controlled by a controller that is functionally connected to the tong controller and/or the tong optical imaging and assessment system. The optical imaging and assessment system may measure distance between upper and lower pipe, and may be configured to provide input to the pipe handler regarding optimal trajectory, speed, and/or positioning for pipe stab-in.

The number of sensors currently used on the tong can be beneficially reduced using the optical imaging and assessment system, and added functionality can be beneficially used to prevent issues previously mentioned and increase efficiency.

An exemplary optical imaging and assessment system 100 is illustrated in FIG. 1. In the illustrated embodiment, one or more optical imaging devices 110 are located on equipment 120 (e.g., a positioning device and/or tong cassette) on a rig. Exemplary optical imaging devices include cameras, 3D cameras, high speed cameras, time lapse cameras, infrared cameras, light detector, charged-coupled device, wide-angled lens camera, high resolution camera, time-of-flight camera, stop motion camera, motion picture camera, etc. The optical imaging devices 110 are positioned to be able to capture an optical image 112 of focus area 130 on equipment 120. For example, if optical imaging devices 110 utilize visible light to capture an optical image 112, then the optical imaging devices 110 are positioned on equipment 120 to have a clear line of sight to focus area 130. In some embodiments, as part of capturing the optical image 112, the optical imaging devices 110 may emit energy 111 (e.g., focusing light) towards the focus area 130. In some embodiments, the optical imaging device 110 may have a light source (e.g., flasher) to emit the energy 111. A light source on the optical imaging device 110 may improve the reliability to properly identify objects or targets regardless of the presence of additional or different lights in the rig environment. The optical imaging devices 110 may then capture an optical image 112, either responsive to the emission of energy 111, or of the focus area 130 in a native state (without prompting from the optical imaging devices 110). In some embodiments, the optical image 112 may be a series of images captured over time (e.g. as with a motion picture camera). In some embodiments, the optical imaging device 110 may include a micro controller. The micro controller may be capable of performing image processing and/or object detection. A local controller 140 is also located on the equipment 120. The local controller 140 is functionally connected to the optical imaging devices 110. For example, in some embodiments, the local controller 140 may be able to send commands 141 (e.g., polling queues) to the optical imaging devices 110, and the optical imaging devices 110 may be able to receive commands 141. As another example, the local controller 140 may be able to receive information 142 from the optical imaging devices 110, and the optical imaging devices 110 may be able to send information 142. For example, the information 142 may be the optical image 112 and/or results of image processing or object detection performed by the optical imaging device 110. The information 142 may be, for example, distance to pipe, height of pipe, width of pipe, status of jaws, status of backup, etc. In some embodiments, the local controller 140 may be able to store, analyze, and/or retransmit the information 142 received from the optical imaging devices 110.

In some embodiments, the local controller 140 may be able to send data 143 to a remote controller 150, and remote controller 150 may be able to receive data 143. For example, the local controller 140 may be able to retransmit the information 142 as data 143. In some embodiments, the local controller 140 may analyze and/or process the information 142, and the local controller 140 may send the results as data 143. The data 143 may be, for example, feedbacks, distance to pipe, height of pipe, width of pipe, status of jaws, status of backup, position of pipe, etc. The remote controller 150 may be remote from the equipment 120. For example, the remote controller 150 may be located in a control room of the rig, or the remote controller may be at a location that is remote from the rig. The remote controller 150 may receive data 143 from the local controller 140 and/or other inputs (e.g., operator input, scheduling input, input from other systems on the rig, etc.). The remote controller may analyze and/or process the data 143 and/or other inputs. The remote controller may be able to send control commands 151 to local controller 140, and local controller 140 may be able to receive commands 151. Data, inputs, commands and/or signals may be sent between local controller 140 and remote controller 150 over a variety of communication channels, including, for example, wires, fiber optics, hydraulic lines, pneumatic lines, and/or wirelessly, including electromagnetic or acoustic signaling.

In some embodiments, local controller 140 may be functionally connected with other sensors 160 on equipment 120. The other sensors 160 are differentiated from the optical imaging devices 110. In some embodiments, the other sensors 160 acquire measurements 162 about focus area 130 that is supplemental to the optical image 112. In some embodiments, the other sensors 160 acquire measurements 164 about one or more auxiliary sites 170 on equipment 120. In some embodiments, the local controller 140 may be able to send commands 145 (e.g., polling queues) to the other sensors 160, and the other sensors 160 may be able to receive commands 145. In some embodiments, the local controller 140 may be able to receive information 146 from the other sensors 160, and the other sensors 160 may be able to send information 146. In some embodiments, the local controller 140 may be able to store, analyze, and/or retransmit the information 146 received from the other sensors 160. For example, the local controller 140 may analyze information 142 from optical imaging devices 110 in combination with information 146 from other sensors 160.

In some embodiments, local controller 140 may be functionally connected with actuators 180 on equipment 120. For example, in some embodiments, the local controller 140 may be able to send commands 147 (e.g., control signals) to the actuators 180, and the actuators 180 may be able to receive commands 147. The commands 147 may be based on, or in response to, the information 142, information 146, and/or analysis of information 142/146. In some embodiments, the commands 147 may instruct the actuators 180 to cause action 181 (e.g., positioning and/or orienting) at the optical imaging devices 110. In some embodiments, the commands 147 may instruct the actuators 180 to cause action 183 at the focus area 130. In some embodiments, the commands 147 may instruct the actuators 180 to cause action 185 at the auxiliary site 170.

Figure 2:
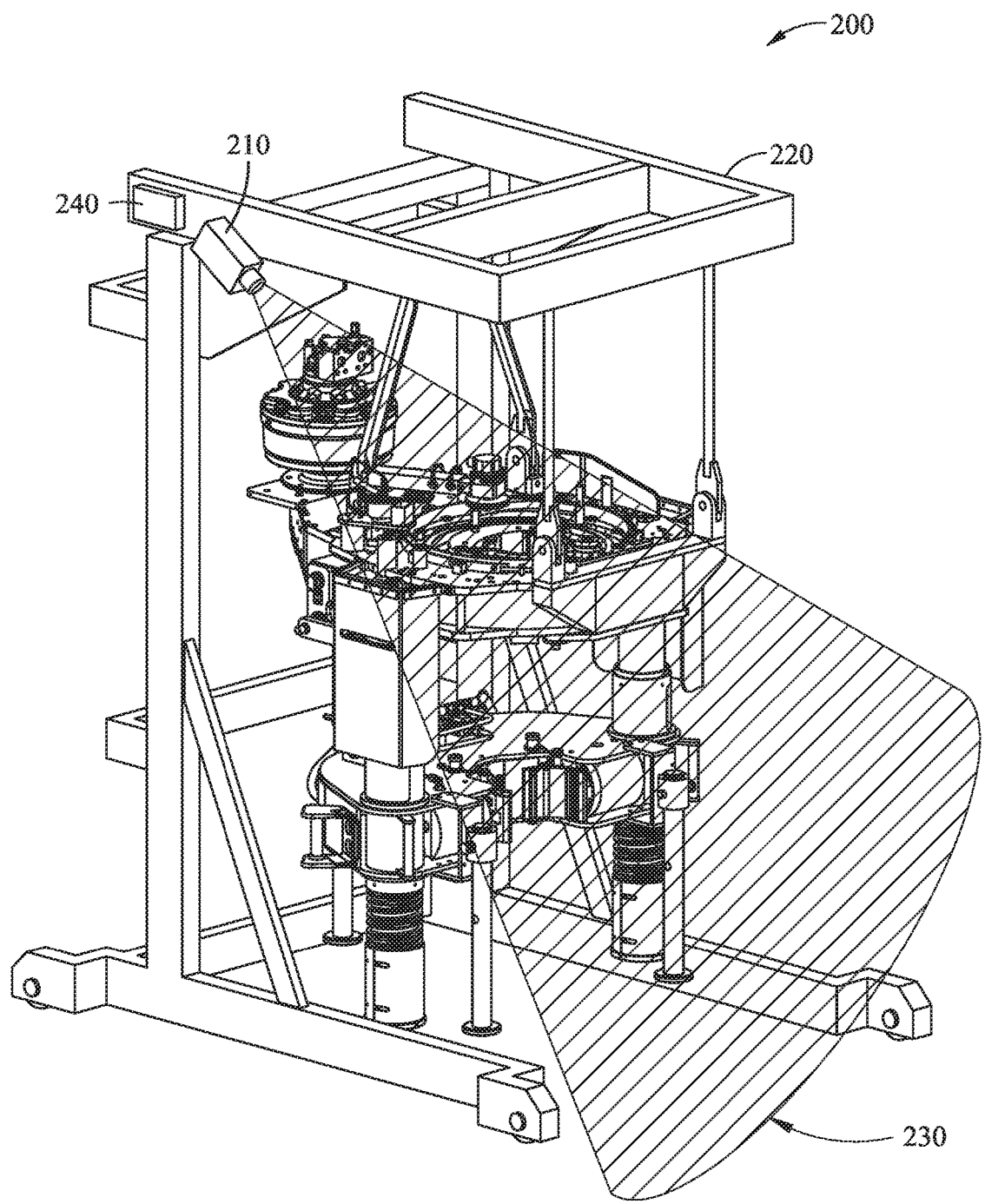
FIG. 2 illustrates another exemplary optical imaging and assessment system.

Another exemplary optical imaging and assessment system 200 is illustrated in FIG. 2. In the illustrated embodiment, one optical imaging device 210 is located on equipment 220 (e.g., a powerframe). The optical imaging device 210 is positioned to be able to capture an optical image of focus area 230 on equipment 220. A local controller 240 is also located on the equipment 220 adjacent to optical imaging device 210. The local controller 240 is functionally connected to the optical imaging device 210.

In some embodiments, information from optical imaging device 210 may include the character and/or status of tong doors, rotor location, rotations per minute, clamping system, tool joint height on well center, pipe size, jaw size installed on tong and backup, pipe position in regards to tong, and/or safety zone surveillance.

Figure 3:
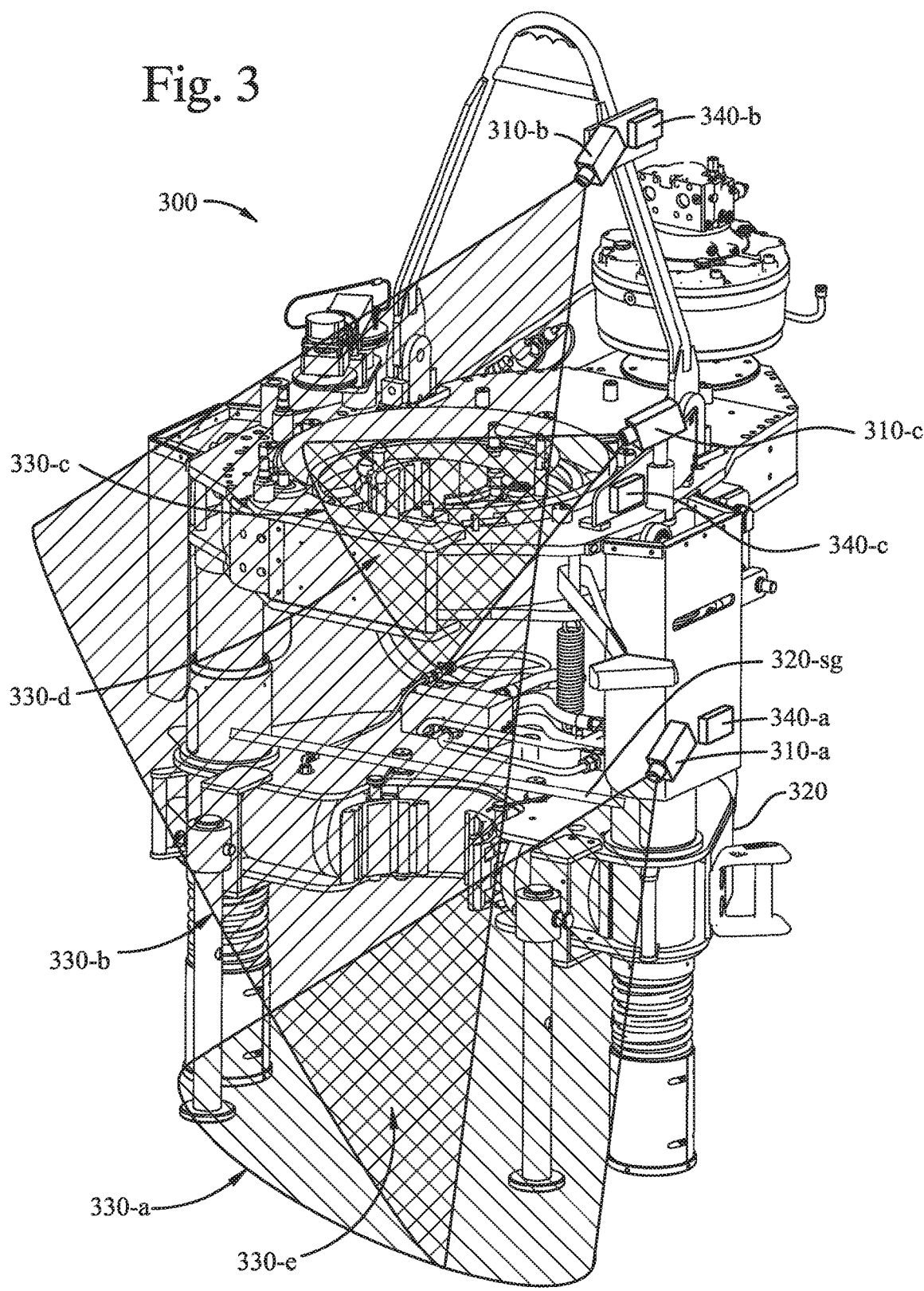
FIG. 3 illustrates another exemplary optical imaging and assessment system.

Another exemplary optical imaging and assessment system 300 is illustrated in FIG. 3. In the illustrated embodiment, three optical imaging devices 310 are located on equipment 320 (e.g., a powerframe). The optical imaging devices 310 are positioned to be able to capture optical images of multiple focus areas 330 on equipment 320. For example, optical imaging device 310-*a* (with local controller 340-*a*) is able to capture an optical image of focus area 330-*a*; optical imaging device 310-*b* (with local controller 340-*b*) is able to capture an optical image of focus area 330-*b*; and optical imaging device 310-*c* (with local controller 340-*c*) is able to capture an optical image of focus area 330-*c*. Additionally, combination images may be created at additional focus areas 330 by combining information from each optical imaging device 310. For example, a combination image at focus area 330-*d* may be generated with information from optical imaging devices 310-*b* and 310-*c*; a combination image at focus area 330-*e* may be generated with information from optical imaging devices 310-*a* and 310-*b*. In particular, focus area 330-*e* may provide a high resolution, 3D image of stabbing guide 320-*sg*.

In some embodiments, information from optical imaging device 310-*a* may include the character and/or status of backup doors, stab-in process, stabbing guide, tool joint height on well center, pipe size, and/or pipe position in regards to tong. In some embodiments, information from optical imaging device 310-*b* may include the character and/or status of tong doors, rotor location, rotations per minute, clamping system, pipe size, jaw size installed on tong and backup, pipe position in regards to tong, and/or safety zone surveillance. In some embodiments, information from optical imaging device 310-*c* may include the character and/or status of tong doors, rotor location, rotations per minute, clamping system, make/break switch and/or actuator position, jaw size installed on tong and backup, and/or safety zone surveillance.

Another exemplary optical imaging and assessment system 400 is illustrated in FIGS. 4A-4G. In the embodiment illustrated in FIG. 4A, equipment 420 includes a positioning device 420-*p*, a tong cassette 420-*t*, and rig floor 420-*f*. Positioning device 420-*p* and a tong cassette 420-*t* may be located on a demarked rig floor 420-*f*. In some embodiments, positioning device 420-*p* is secured to the rig floor 420-*f*. In some embodiments, positioning device 420-*p* may be secured such that positioning device 420-*p* may rotate and/or move vertically relative to rig floor 420-*f*. Positioning device 420-*p* may be configured to lift and/or move tong cassette 420-*t* from one position/orientation on or near the rig floor 420-*f* to another. A variety of positioning devices are currently available, many suitable for adapting to embodiments disclosed herein. For example, a suitable positioning device 420-*p* is disclosed in U.S. Pat. No. 9,068,406. Another suitable positioning device 420-*p* is disclosed in co-pending U.S. patent application Ser. No. 15/667,504. In some embodiments, the initial state of optical imaging and assessment system 400 includes data representative of tong cassette 420-*t* being generally located on rig floor 420-*f* within demarcation 425-*t*, and of positioning device 420-*p* being generally located on rig floor 420-*f* within demarcation 425-*p*, but exact positioning/orientation of each remains unquantified. Such initial state data may be stored, for example, in remote controller 450.

Figure 4A:
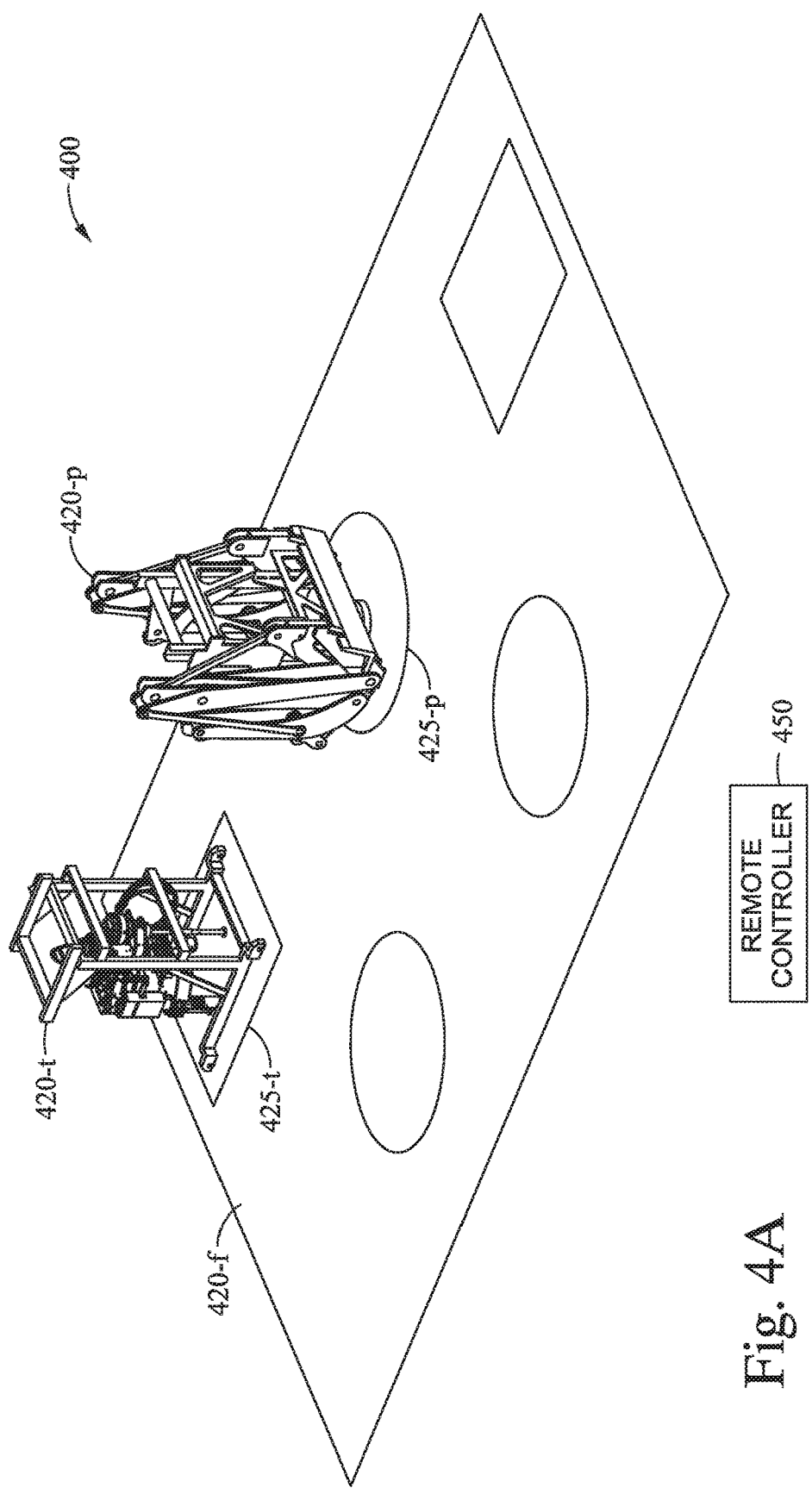
FIGS. 4A-4G illustrate another exemplary optical imaging and assessment system.
Figure 4B:
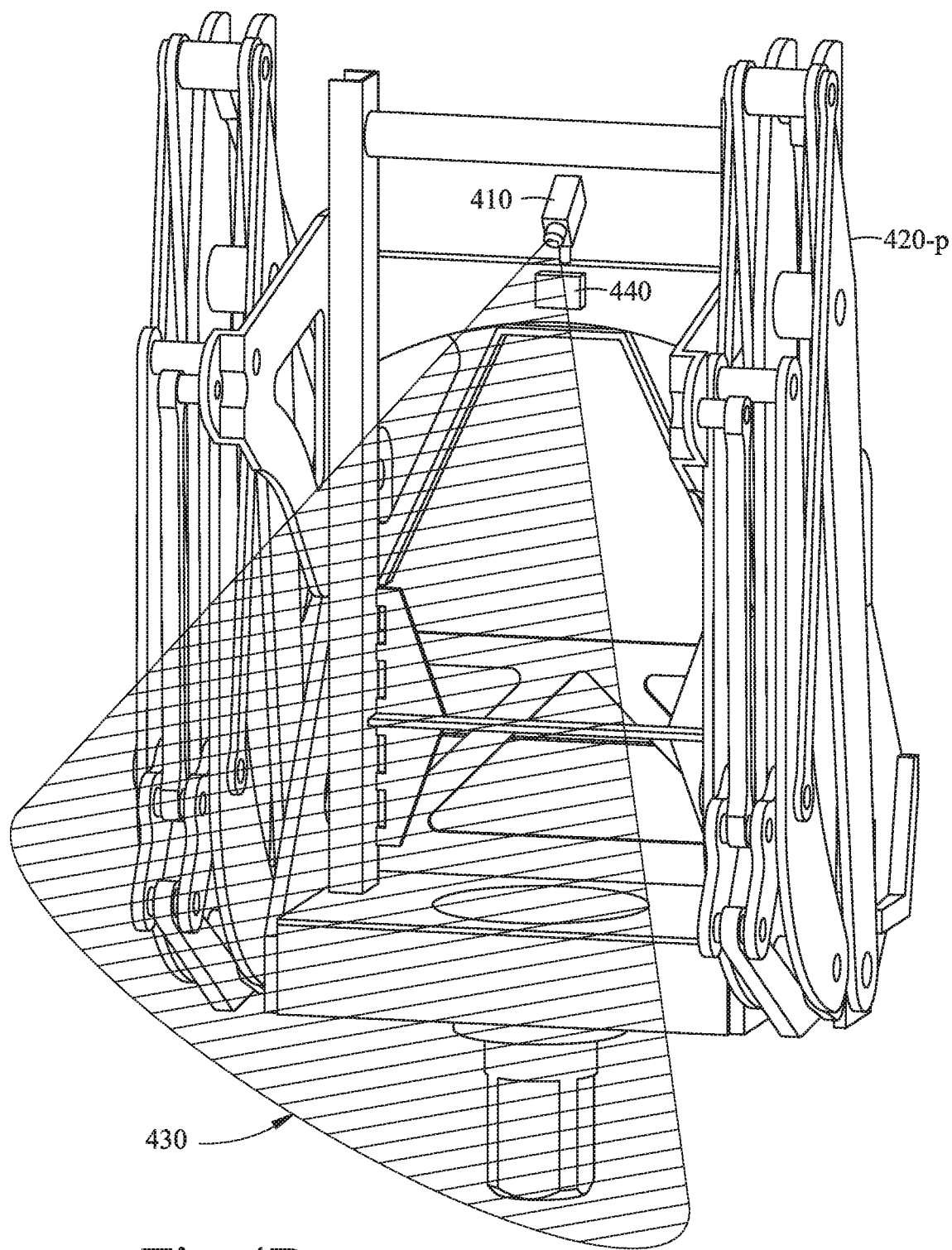

As illustrated in FIG. 4B, an optical imaging device 410 (e.g., cameras, 3D cameras, high speed cameras, time lapse cameras, infrared cameras, light detector, charged-coupled device, wide-angled lens camera, high resolution camera, time-of-flight camera, stop motion camera, motion picture camera, etc.) is located on positioning device 420-*p*. The optical imaging device 410 is positioned to be able to capture optical images of a focus area 430. The optical imaging device 410 is functionally connected to local controller 440. Local controller 440 may be able to send data to and/or receive commands from remote controller 450.

Figure 4C:
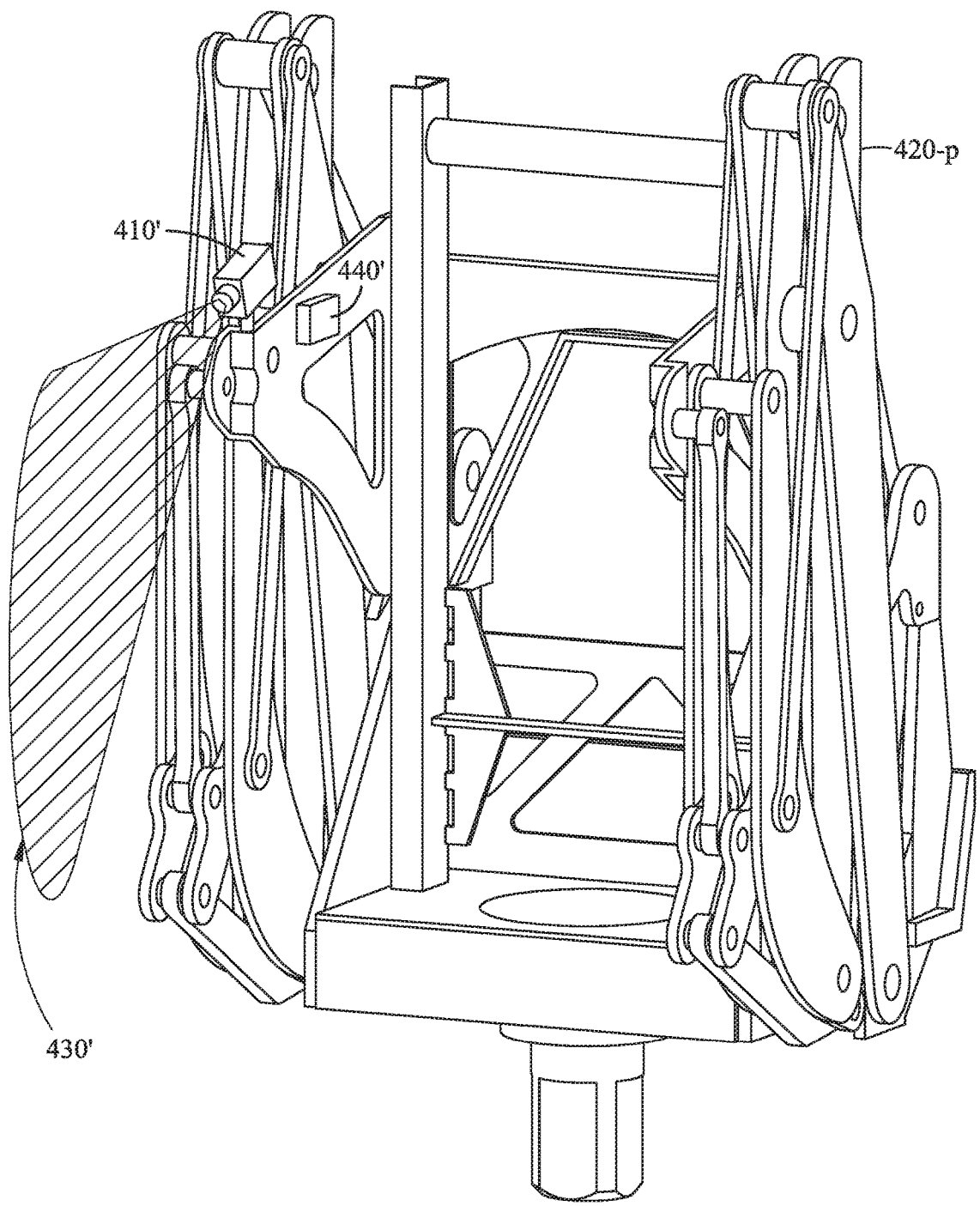

Alternatively, as illustrated in FIG. 4C, an optical imaging device 410' is located at a different location on positioning device 420-*p*. The optical imaging device 410' is positioned to be able to capture optical images of a focus area 430'. The optical imaging device 410' is functionally connected to local controller 440'. Local controller 440' may be able to send data to and/or receive commands from remote controller 450. The location of optical imaging device 410' on positioning device 420-*p* may be changed according to operational and/or manufacturing specifications. For example, when the desired location of focus area 430' is changed, the location of optical imaging device 410' may be changed.

Figure 4D:
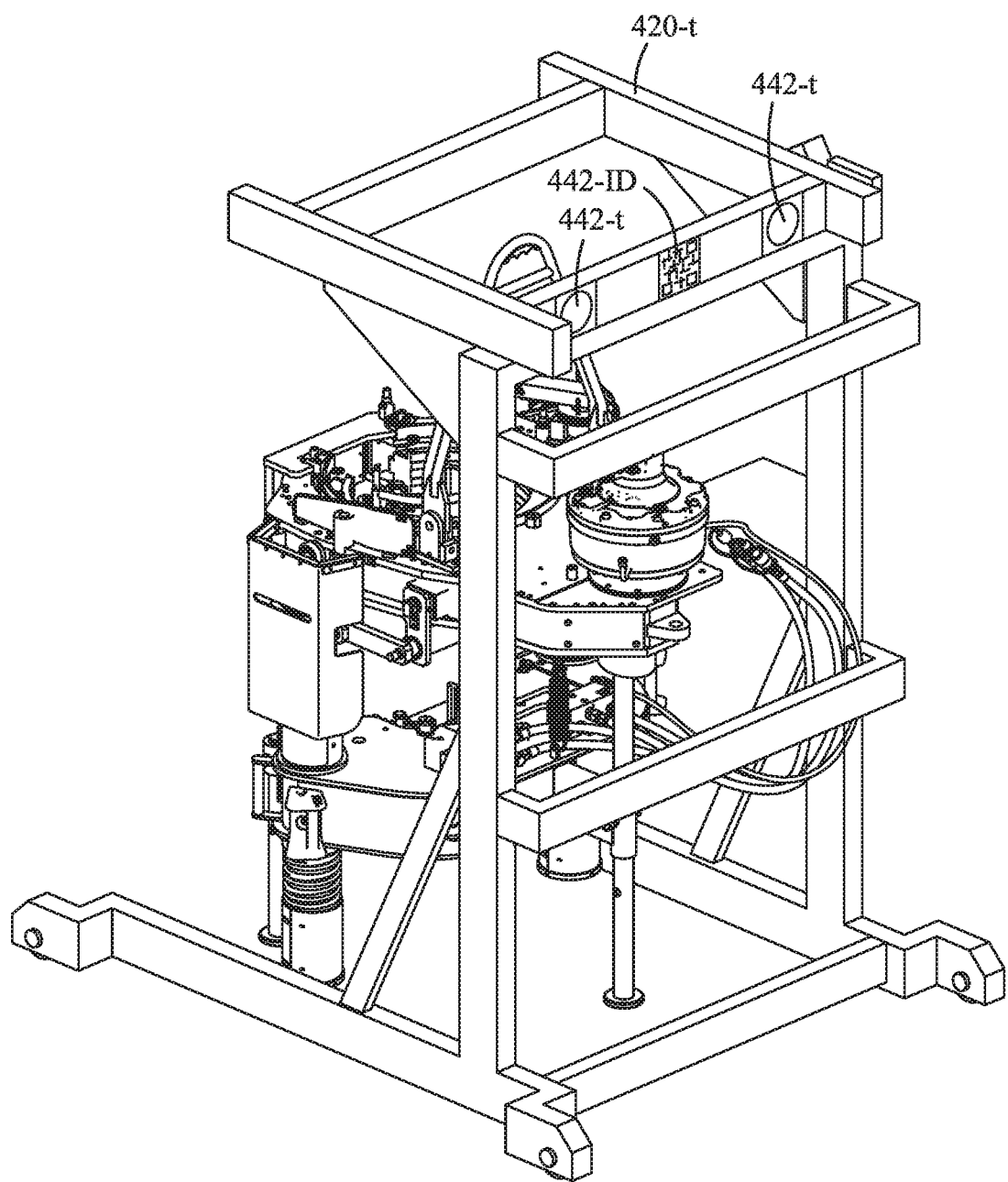

An exemplary tong cassette 420-*t* is illustrated in FIG. 4D. An identification tag 442-ID (e.g., QR code) may be located on tong cassette 420-*t*. In some embodiments, the identification tag 442-ID is located to be visible to focus area 430 (see FIG. 4E). One or more targets 442-*t* may be located on tong cassette 420-*t*. In some embodiments, one or more of the targets 442-*t* is located to be visible to focus area 430 (see FIG. 4E). In some embodiments, an identification tag 442-ID may function as a target 442-*t*. The location of identification tag 442-ID and/or target(s) 442-*t* on tong cassette 420-*t* may be changed according to operational and/or manufacturing specifications. For example, when the desired location of focus area 430 is changed, the location of identification tag 442-ID and/or target(s) 442-*t* may be changed. In some embodiments, the targets 442-*t* may be located symmetrically on tong cassette 420-*t*.

Figure 4E:
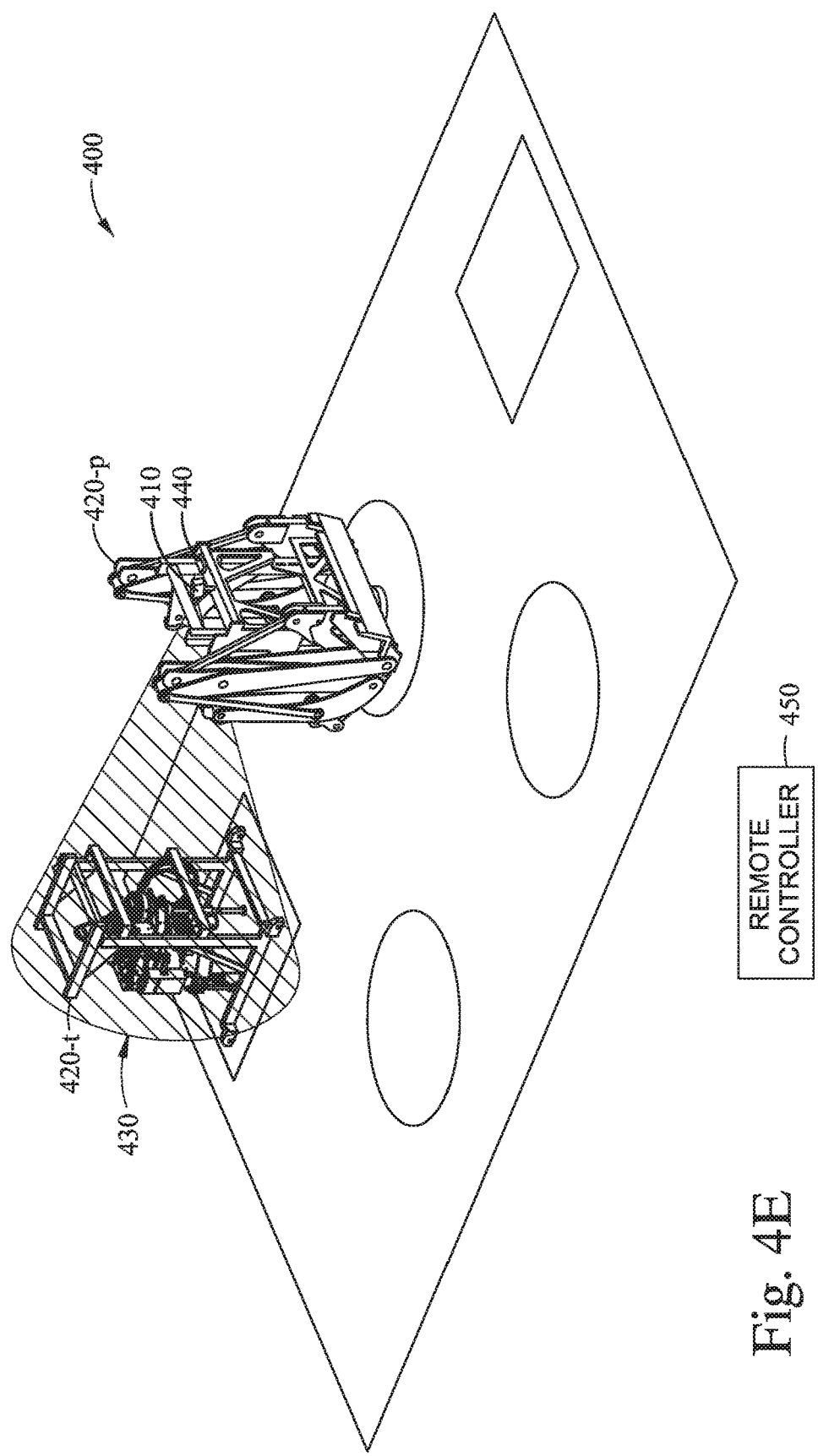

As illustrated in FIG. 4E, during operation, at least a portion of tong cassette 420-*t* may be visible to focus area 430. In some embodiments, the identification tag 442-ID and/or one or more targets 442-*t* may be visible to focus area 430. During operation, optical imaging device 410 may capture an optical image of the portion of tong cassette 420-*t* that is visible to focus area 430. The local controller 440 may be able to receive information 442 from the optical imaging device 410. For example, the information 442 may include the optical image, results of image processing or object detection performed by the optical imaging device 410, time-of-flight of a light signal between the optical imaging device 410 and points imaged in focus area 430, identification information from identification tag 442-ID, location information of the one or more targets 442-*t*, distance between the one or more targets 442-*t*, size of the one or more targets 442-*t*, relative orientation of the one or more targets 442-*t*, distance between positioning device 420-*p* and tong cassette 420-*t*, and/or orientation angle between positioning device 420-*p* and tong cassette 420-*t*.

The information 442 may be analyzed to determine further information. For example, if the optical imaging device is a time-of-flight camera, the information 442 may be analyzed to determine a distance between the positioning device 420-*p* and the tong cassette 420-*t*. As another example, the orientation of tong cassette 420-*t* may be determined by first determining the relative sizes (e.g., pixels) of a first and second target 442-*t* in the image information 442. If the first and second targets 442-*t* are known to be identical (or of known dimensions), the difference in size in the image information 442 determines the deviation angle between the two targets 442-*t* with respect to the positioning device 420-*p*. The deviation angle may then determine the orientation of the tong cassette 420-*t* relative to the positioning device 420-*p*.

Efficient and/or optimal trajectories for movement of tong cassette 420-*t* may be calculated by a local controller 440 and/or remote controller 450 based on the information 442 from the optical imaging device 410. For example, the efficient and/or optimal trajectories may minimize time, maximize speed, minimize distance traveled, minimize fuel consumption, minimize risk to personnel, minimize component wear, or any combination of such or similar parameters.

Figure 5:
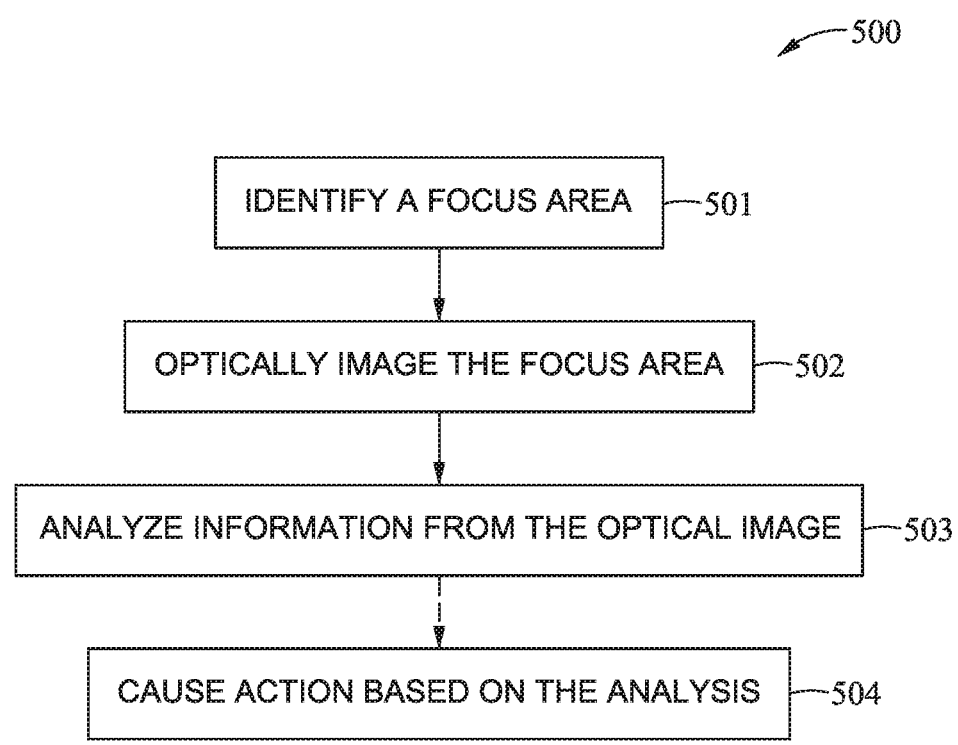
FIG. 5 illustrates an exemplary method utilizing an optical imaging and assessment system.

A method 500 utilizing optical imaging and assessment system 400 is illustrated in FIG. 5. The method begins at step 501, wherein focus area 430 is identified. For example, identifying focus area 430 may include steps such as installing optical imaging device 410 on positioning device 420-*p*, locating the positioning device 420-*p* on the rig floor 420-*f*, locating the tong cassette 420-*t* on the rig floor 420-*f*, and/or estimating a range of locations of optical information once the positioning device 420-*p* and tong cassette 420-*t* are so positioned. In some embodiments, identifying a focus area 430 may involve an iterative process. For example, optical imaging device 410 may capture an optical image of a portion of tong cassette 420-*t* when optical imaging device 410 is in a first orientation. The optical image may be analyzed to determine if the first focus area 430 includes sufficient information (e.g., whether identification tag 442-ID is visible to focus area 430). Local controller 440 and/or remote controller 450 may analyze the optical image and/or send commands to change the orientation of optical imaging device 410 on positioning device 420-*p*. In the second orientation, a second optical image may be captured and analyzed to determine if the first focus area 430 includes sufficient information. This process may be repeated until, for example, focus area 430 is determined to include sufficient information. It should be appreciated that the iterative process to identify a focus area is, itself, an embodiment of method 500. In some embodiments, focus area 430 may include a tong cassette installation area, an area defined by rig operator or customer, an area including a tong cassette, a well center and/or auxiliary position, an area including tong-related components, an area including tong doors, an area including backup doors, a rotor location, a pipe location, an area including a clamping system, a make/break switch and/or actuator position, an area including a tool joint, an area including a jaw, and/or a safety zone.

The method 500 continues at step 502, wherein the focus area 430 is optically imaged. For example, optically imaging focus area 430 may include capturing an optical image of the focus area 430. The optical image may be a high resolution infrared image. The optical image may include an image of an identification tag 442-ID and/or one or more targets 442-*t*. In some embodiments, the optical image may be a series of images captured over time (e.g. as with a motion picture camera).

The method 500 continues at step 503, wherein information from the optical image is analyzed. For example, pattern recognition and lookup may be applied to the image of identification tag 442-ID to determine the type of cassette identified by identification tag 442-ID. As another example, relative sizing of target points within the image may be utilized to determine the distance between the optical imaging device 410 (and thereby the positioning device 420-*p*) and the tong cassette 420-*t*. Similarly, relative positioning and sizing within the image may be utilized to determine the orientation angle between the optical imaging device 410 (and thereby the positioning device 420-*p*) and the tong cassette 420-*t*. In some embodiments, local controller 440 may perform at least a portion of the analysis of the information. In some embodiments, remote controller 450 may perform a portion of the analysis of the information. Additional information may be utilized in the analysis. For example, additional information may include the arm length of the positioning device 420-*p*, the type of turns counter, and/or the load cell range.

Figure 4F:
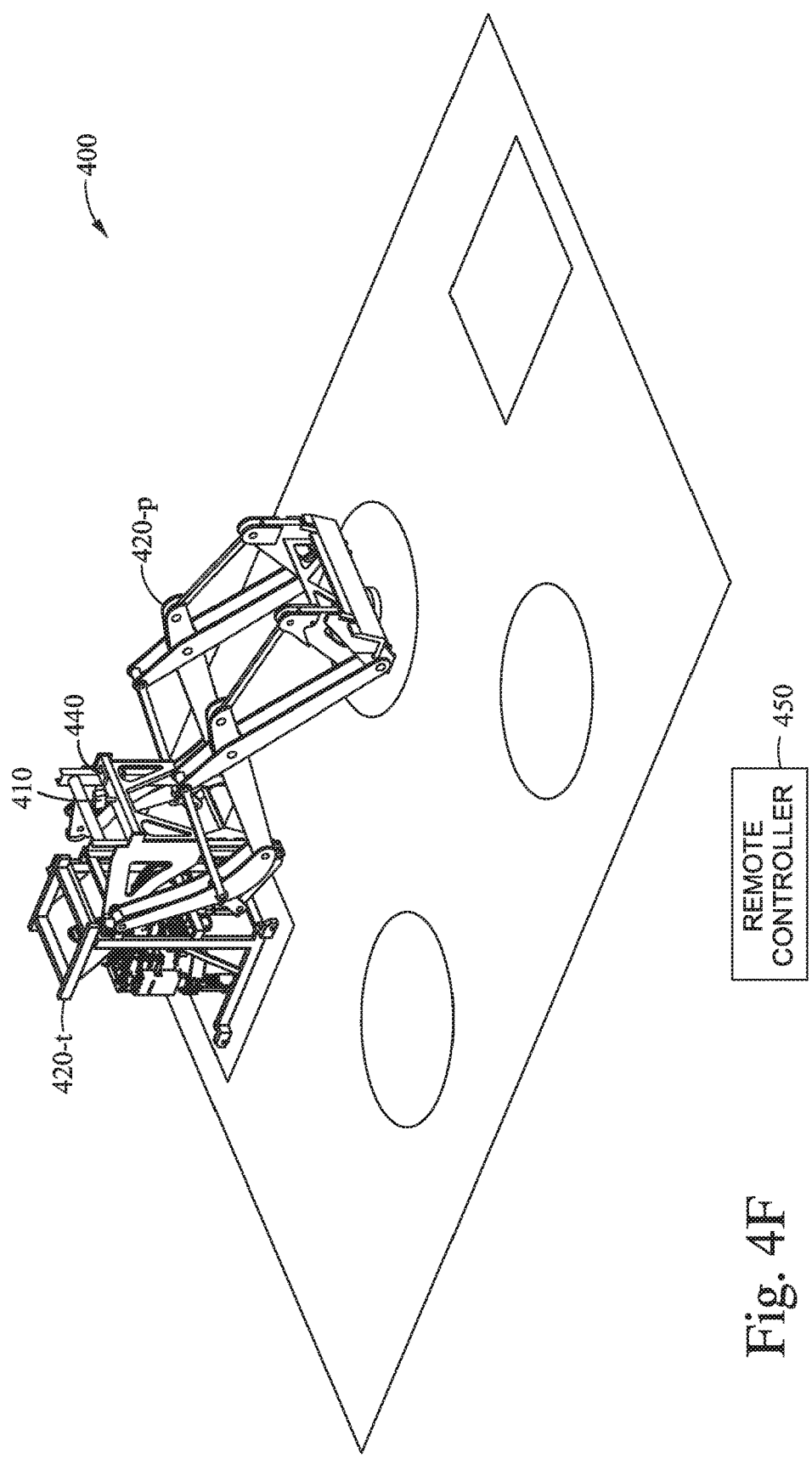
Figure 4G:
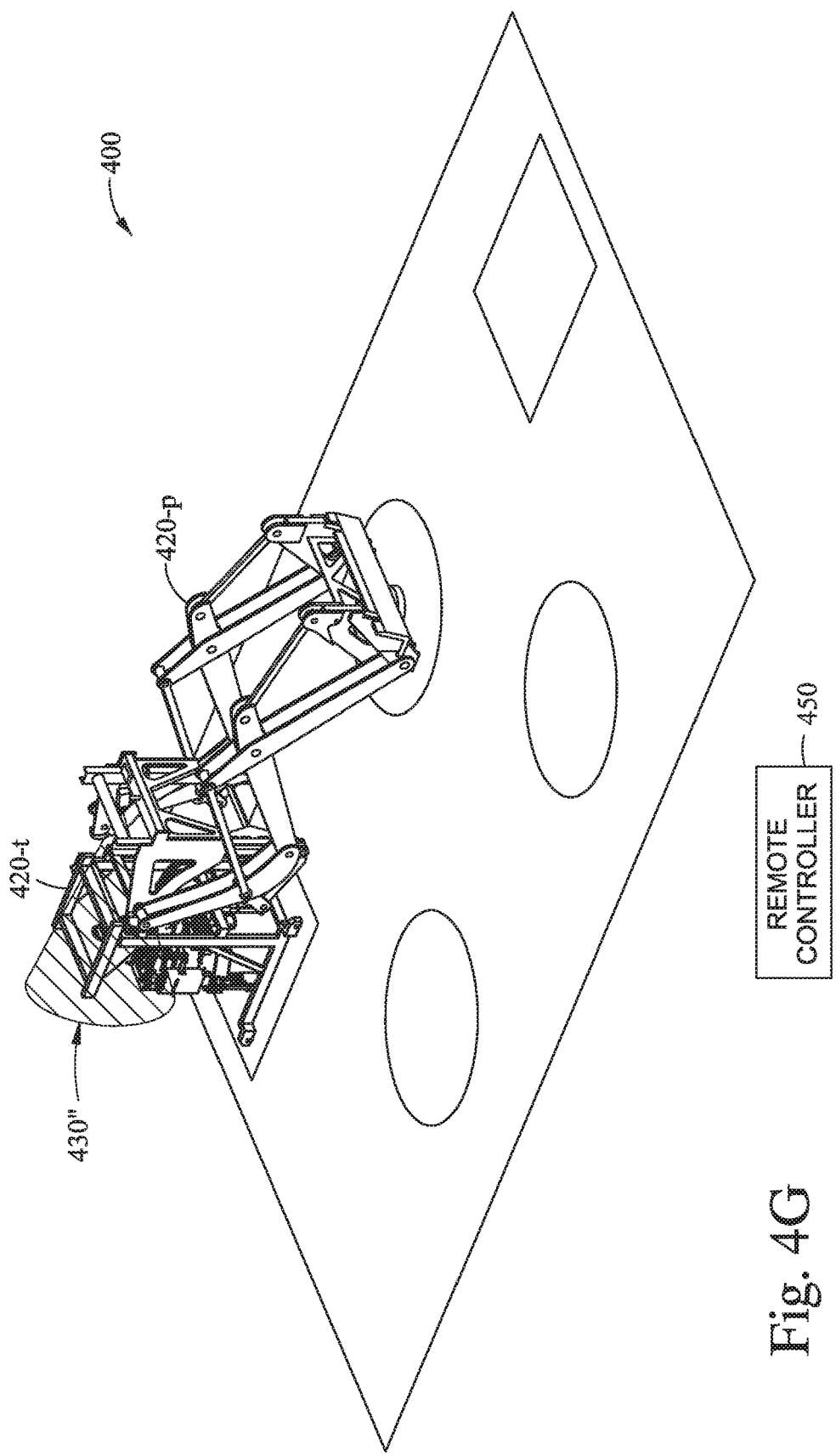

In some embodiments, the method 500 continues at step 504, wherein action is caused based on the analysis. For example, remote controller 450 and/or local controller 440 may send commands to actuators on positioning device 420-*p* based on the analysis of information in step 503. The positioning device 420-*p* may extend its arms a particular distance and angle based on the analysis of information in step 503, as illustrated in FIG. 4F. The method 500 may iterate as the positioning device 420-*p* connects to the tong cassette 420-*t*. For example, with the arms extended, a second focus area 430" may be identified that includes aspects of the tong cassette 420-*t* not visible in the first focus area 430, as illustrated in FIG. 4G. The focus area 430" may be optically imaged, and information from the optical image may be analyzed. Based on the analysis, remote controller 450 and/or local controller 440 may generate command signals to lock the tong cassette 420-*t* in the arms of positioning device 420-*p*. It should be appreciated that causing action in step 504 may involve multiple iterations of method 500.

In an embodiment a method includes: identifying a focus area on a tong cassette; optically imaging the focus area with an optical imaging device on a positioning device; and analyzing information from the optical imaging to determine an assessment of the focus area.

In one or more embodiments disclosed herein, the optical imaging device comprises at least one of a high resolution infrared camera and a time-of-flight camera.

In one or more embodiments disclosed herein, the method also includes: identifying a second focus area on the tong cassette; optically imaging the second focus area with the optical imaging device; and analyzing information from each of the optical imagings.

In one or more embodiments disclosed herein, the focus areas are different.

In one or more embodiments disclosed herein, the method also includes: iteratively optically imaging the focus area; and analyzing information from each of the optical imagings.

In one or more embodiments disclosed herein, the assessment is at least one of distance between the tong cassette and the positioning device, and relative orientation between the tong cassette and the positioning device.

In one or more embodiments disclosed herein, the method also includes causing action based on the analyzing, wherein the action comprises at least one of extending arms of the positioning device, connecting the positioning device to the tong cassette, and locking the tong cassette in the arms of the positioning device.

In one or more embodiments disclosed herein, the method also includes iteratively: identifying an nth focus area on the tong cassette; optically imaging the nth focus area with the optical imaging device; analyzing information from the optical imaging to determine an nth assessment of the nth focus area; and causing an nth action based on the analyzing.

In one or more embodiments disclosed herein, the focus area does not change from one iteration to the next.

In one or more embodiments disclosed herein, at least one of an identification tag and a target is visible in the focus area.

In one or more embodiments disclosed herein, the optical imaging the focus area comprises capturing a series of images over time.

In an embodiment, a system includes: a tong cassette having a focus area; a positioning device having an optical imaging device configured to image the focus area; and an analyzing device functionally connected to the optical imaging device to be able to receive information therefrom.

In one or more embodiments disclosed herein, the optical imaging device comprises at least one of a high resolution infrared camera and a time-of-flight camera.

In one or more embodiments disclosed herein, the analyzing device is configured to determine at least one of distance between the tong cassette and the positioning device, and relative orientation between the tong cassette and the positioning device.

In one or more embodiments disclosed herein, the system also includes an actuator capable of receiving commands from the analyzing device.

In one or more embodiments disclosed herein, the actuator is configured to cause at least one of extending arms of the positioning device, connecting the positioning device to the tong cassette, and locking the tong cassette in the arms of the positioning device.

In one or more embodiments disclosed herein, at least one of an identification tag and a target is visible in the focus area.

In an embodiment, an optical imaging and assessment system—for use with a positioning device and a tong cassette—includes: an optical imaging devices located on the positioning device; a focus area on the tong cassette, wherein the optical imaging device is positioned to be able to capture an optical image of the focus area; and a local controller located on the positioning device and functionally connected to the optical imaging device.

In one or more embodiments disclosed herein, the optical imaging device comprises a light source to emit energy towards the focus area.

In one or more embodiments disclosed herein, the optical imaging device comprises a micro controller.

In one or more embodiments disclosed herein, the system also includes a remote controller located remotely from the positioning device and the tong cassette.

While the foregoing is directed to embodiments of the present invention, other and further embodiments of the invention may be devised without departing from the basic scope thereof, and the scope thereof is determined by the claims that follow.

The invention claimed is:

1. A method comprising:
    identifying a focus area on a tong cassette coupled to a tong;
    optically imaging the focus area using an optical imaging device on a positioning device;
    analyzing information from the optical imaging to determine an assessment of the focus area; and
    causing action based on the analyzing, wherein the action comprises at least one selected from the group of extending a plurality of arms of the positioning device, connecting the positioning device to the tong cassette, and locking the tong cassette in the arms of the positioning device.

2. The method of claim 1, wherein the optical imaging device comprises at least one of a high resolution infrared camera and a time-of-flight camera.

3. The method of claim 1, wherein the focus area is a first focus area, and further comprising:
    identifying a second focus area on the tong cassette;
    optically imaging the second focus area with the optical imaging device; and
    analyzing information from each of the optical imagings.

4. The method of claim 3, wherein the first and second focus areas are different.

5. The method of claim 1, further comprising:
    iteratively optically imaging the focus area; and
    analyzing information from each of the optical imagings.

6. The method of claim 1, wherein the assessment is selected from the group consisting of distance between the tong cassette and the positioning device, and relative orientation between the tong cassette and the positioning device.

7. The method of claim 1, further comprising iteratively:
    identifying an nth focus area on the tong cassette;
    optically imaging the nth focus area with the optical imaging device;
    analyzing information from the optical imaging to determine an nth assessment of the nth focus area; and
    causing an nth action based on the analyzing.

8. The method of claim 7, wherein the focus area does not change from one iteration to the next.

9. The method of claim 1, wherein at least one of an identification tag and a target is visible in the focus area.

10. The method of claim 1, wherein the optical imaging the focus area comprises capturing a series of images over time.

11. The method of claim 1, further comprising moving the tong cassette from a first position to a second position.

12. A system comprising:
    a tong cassette having a focus area, wherein the tong cassette is coupled to a tong;
    a positioning device having an optical imaging device configured to image the focus area;
    an analyzing device functionally connected to the optical imaging device to receive information therefrom; and
    an actuator capable of receiving commands from the analyzing device.

13. The system of claim 12, wherein the optical imaging device comprises at least one of a high resolution infrared camera and a time-of-flight camera.

14. The system of claim 12, wherein the analyzing device is configured to determine a distance between the tong cassette and the positioning device, a relative orientation between the tong cassette and the positioning device, or both.

15. The system of claim 12, wherein the actuator is configured to cause one or more actions selected from the group consisting of extending a plurality of arms of the positioning device, connecting the positioning device to the tong cassette, and locking the tong cassette in the arms of the positioning device.

16. The system of claim 12, wherein at least one of an identification tag and a target is visible in the focus area.

17. The system of claim 12, wherein the positioning device is configured to move the tong cassette from a first position to a second position.

18. An optical imaging and assessment system for use with a positioning device and a tong cassette, the system comprising:
    an optical imaging device located on the positioning device;
    a tong coupled to the tong cassette;
    a focus area on the tong cassette, wherein the optical imaging device is positioned to capture an optical image of the focus area; and
    a local controller located on the positioning device and functionally connected to the optical imaging device.

19. The system of claim 18, wherein the optical imaging device comprises one of a light source to emit energy towards the focus area and a micro controller.

20. The system of claim 18, further comprising a remote controller located remotely from the positioning device and the tong cassette.

21. The system of claim 18, wherein the positioning device has arms configured to extend and engage the tong cassette.

22. The system of claim 21, wherein the positioning device is configured to move the tong cassette from a first position to a second position.

\* \* \* \* \*